United States Patent [19]

Friswell

[11] 4,070,004
[45] Jan. 24, 1978

[54] DIAPHRAGM VALVE

[75] Inventor: David R. Friswell, Holliston, Mass.

[73] Assignee: Waters Associates, Inc., Milford, Mass.

[21] Appl. No.: 662,345

[22] Filed: Mar. 1, 1976

[51] Int. Cl.² .............................................. F16K 7/14
[52] U.S. Cl. ..................................... 251/331; 251/368
[58] Field of Search .................. 92/103 SD; 251/331, 251/61.1, 368; 526/255

[56] References Cited

U.S. PATENT DOCUMENTS

| | | | |
|---|---|---|---|
| 2,654,559 | 10/1953 | Frank | 251/331 X |
| 3,140,615 | 7/1964 | Broerman | 251/331 X |
| 3,477,693 | 11/1969 | Bezanis | 251/331 X |
| 3,747,479 | 7/1973 | Nightingale et al. | 251/368 X |
| 3,850,900 | 11/1974 | Segawa | 526/255 X |
| 3,918,495 | 11/1975 | Abrahams | 251/331 X |

Primary Examiner—Arnold Rosenthal
Attorney, Agent, or Firm—Irons and Sears

[57] ABSTRACT

An improved diaphragm valve, particularly adapted for applications at high pressures and in applications in which low dead volume is required. The valve has a diaphragm which is formed of a halogenated hydrocarbon polymer of a compression strength sufficient to avoid non-recoverable extrusion of the diaphragm. Use of such a valve totally avoids the work-hardening problem encountered in use of valves using metal diaphragms.

13 Claims, 2 Drawing Figures

DIAPHRAGM VALVE

BACKGROUND OF THE INVENTION

This invention relates to an improved diaphragm valve.

It has been a problem in the art to provide diaphragm valves which are chemically inert, have very little "dead space" within, and are reliably operated for many thousands of cycles without maintenance requirements. Such valves are useful in a great many applications. However, the above-recited characteristics are particularly well suited to use in liquid chromatographic apparatus. Such apparatus handles extremely small liquid flow streams. Moreover, into such streams are injected samples for analysis which are frequently on the order of a microliter in volume.

Such samples must move smoothly through valving without undue mixing and without loss. Because of the variety of carrier liquids and sample chemicals used by a chromatographer, the valves must be constructed of chemically inert materials. Moreover, since the user is often a chemist or biologist in a laboratory with limited maintenance capabilitites, it is desirable that valves installed in the apparatus last for the lifetime of the apparatus in which they are installed.

The valves in the prior art which are useful at high pressures in such applications rely on metal diaphragms one of the best of which is described in U.S. Pat. No. 3,918,495 to Abrahams, Such reliance is necessary because such chemicallyinert materials as polytetrafluoroethylene (Teflon) excessively and, at fluid operating pressures which are from 3000 to 8000 psi, extrude right out of the valve structure. Moreover, the highly localized pressures which are inherent in simple, low-volume, flow-characteristics of such valves have required the strength of a metal diaphram. Nevertheless, chemically-inert metal diaphragms are subject to deterioration because of work hardening and, moreover, are less desirable than polymeric materials because of their inability to seal around any specks of dirt which may get between the sealing face of the diaphragm and the structure of the valve. At high pressures, this rigidity of useful, corrosion-resistant metals is such as to allow damage to, and/or leakage in, the valve.

SUMMARY OF THE INVENTION

Therefore, it is a principal object of the invention to provide an improved diaphragm valve which, although simple in construction, has an extended maintenance-free service life and is adapted to handle small rates of flow.

The above objects have been substantially achieved by construction of a diaphragm valve wherein the diaphragm is formed of a fluorocarbon polymer characterized as is described below:

Compressive Strength (ASTM D695)—at least about 5,000 less than about 10,000 psi Tensile Elastic Modules (ASTM D638)—at least about 100,000 to 400,000 psi "Fluorocarbon polymer" as used herein is meant to describe those polymers comprising a carbon chain and at least about 25% of the substituent elements being fluorine as opposed to hydrocarbon as chlorine. As will be obvious from the discussion below, more fluorine is desirable because it contributes to the chemical stability of the polymer. Nevertheless, the physical properties of the polymers used cannot be materially compromised to achieve maximum chemical stability.

The useful materials are fluorocarbon polymers characterized by excellent chemical inertness, good resiliency and excellent chemical properties. Fluorine is the preferred halogen, although some hydrogen and, in some cases, chlorine are tolerable along the carbon chain of the polymer. Ordinary non-reinforced polytetrafluoroethylene is not useful because it will liquify and extrude during use in applications wherein the fluid being handled is commonly above 5000 psig. Most of the commercial grades of this polymer which are reinforced do not provide the resilience required for the diaphragm of the valve disclosed herein. Moreover, a polymer of $CH_2CF_2$, which is sold under the trade designation Kynar by Pennwalt Corp., is not useful in general applications even though it is resistant to such extrusion. This, most probably, is because it bears hydrogen ions which markedly reduce its resistance to a substantial number of chemicals.

Other materials which have both good chemical resistance and good compressive strength have been found to have insufficient resilience to function in a critical diaphragm valve application. The present commercial grades of reinforced polytetrafluoroethylene are typical of such materials Applicant has found that certain fluorienated polymers—properly incorporated into a novel assembly—can be used in improved high-pressure diaphragm valve construction. In such applications, they provide long-term service free from the sealing problems which are associated with metal-diaphragm valve.

The fluorinated polymers of interest are those having compressive stengths above 5,000 psi, good resiliency such as characterized by a tensile elastic modulus of 100,000 to 400,000 and excellent chemical resistance.

Among materials meeting such criteria is a material known in the art as a modified ETFE polymer and sold under the trade designation TEFZEL 280 by E. I. DuPont de Nemours & Company. Another such useful material is the type known to the art as an E-CTFE polymer and sold under the trade designation HALAR by Allied Chemical Corporation. This material, bearing some chlorine and a substantial amount of hydrogen, is somewhat less versatile in its chemical resistance than is the modified ETFE polymer. In this respect, it resembles the above-mentioned polymer of $CH_2CF_2$. Nevertheless, the E-CTFE polymer, like the $CH_2CF_2$ polymer has excellent mechanical properties and can be utilized in many applications wherein the range of chemicals to be in contact with the material is known, and wherein such known chemicals will not unduly attack, or be absorbed, in diaphragm material. Also, some grades of CTFE resins are operable, but they, too, tend to lack the versatile chemical resistance of the modified ETFE polymer.

In practice, use of the invention at high pressures requires a moderating support disc on the non-wetted side of the diaphragm. This disc moderates the rate of stress and amount of strain applied to the mechanically-secured peripheral area of the polymeric diaphragm material when it is subjected to sudden force when the diaphragm valve is opened at high pressures. A metal support disc is preferred but support discs formed of high-strength structural plastics may also be used.

The metal disc itself will have a moderated rate of withdrawal; this may be achieved by holding the disc in peripheral compression with the peripheral structure of the diaphragm as is described hereinbelow. The fact that this support in non-wetted allows a broad choice of materials based upon their mechanical properties. However, a stainless steel disc of the Type 300 series is entirely suitable for use. The disc may be of the simplest construction, does not require any special mechanical or chemical machining, and, consequently, is relatively resistant to work hardening.

ILLUSTRATIVE EMBODIMENT OF THE INVENTION

In this application and accompanying drawings, there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understood the invention and the principles thereof and will be able to modify it and embody it in a variety of forms, each as may be best suited in the condition of a particular case.

Figure 1:
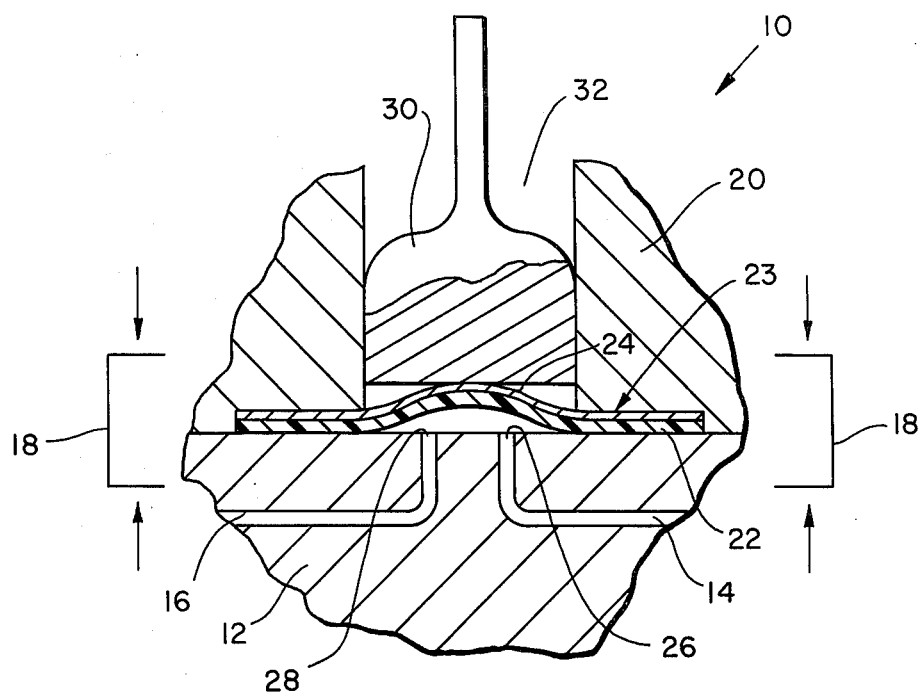
FIG. 1 illustrates, schematically and partially in section a valve 10 constructed according to the invention.

The valve 10 comprises a valve conduit block 12 in which inlet conduit 14 and outlet conduit 16 provide a path for fluid flow. Compressed (by any means known to the art such as nuts and bolts and schematically illustrated at 18) against valve block 12 is an actuator housing block 20. Compressed between blocks 12 and 20, are (a) an 0.010-inch thick sheet 22 of a modified ETFE plastic, forming a diaphragm 23, and (b) an 0.003-inch thick sheet 24 of Type 304 stainless steel, forming a diaphragm support means. As is seen in FIG. 1, plastic sheet 22 is directly over the outlet port 26 of inlet conduit 14 and the inlet port 28 of outlet conduit 16. Thus, when pressed against these ports it effectively stops flow between conduits 14 and 16. When pushed away from the ports, it allows fluid flow between these conduits. The piston 30 serves as a means to close the valve by depressing the diaphragm.

Piston 30 fits, with only about an 0.0005-inch clearance into cavity 32 and may be actuated by any manual or automated means known to the art for use with high pressure valving. The piston itself serves as means to give structural support to the metal supporting sheet 24. Using this structure, the valve may be opened automatically (as by solenoid actuation) as well as manually.

The sheet-forming diaphragm 22 and sheet 24 are conveniently circular discs which are held in position by the compression of blocks 12 and 20. It is desirable that the radial dimensions of the disc held in compression equal or exceed, preferably be at least two times, the radial dimension of the disc which is subjected to contact with piston 30. Thus, the area under compression is at least 300%, preferably 800%, of the area of the diaphragm which is actually wetted by the fluid or contacted by the actuator.

The importance of the disc formed of sheet 24 is that it has a much greater strength. Thus, when a sudden force is applied to the diaphragm—as when the valve is opened with 5,000 psig fluid in conduit 14—the metal disc is strong enough to "brake" the polymeric material and thereby absorb stress that would otherwise have to be bourn entirely by the polymeric diaphragm. This diaphragm supporting action allows the diaphragm to move away from the conduits without an initial stress adjacent its periphery which would exceed its elastic yield and tensile strengths. Thus, the excessive stress and strain, which would be a particular problem in the annular region of the diaphragm wherein it would be thrusted upwardly along the interior wall of cavity 32, is wholly avoided.

It should be noted that the above-described valve has little or no substantial deadspace (i.e. void volume) when it is shut. Moreover, it is fully operable when the disc is allowed to withdraw from its sealing position by a maximum of from 0.004 to 0.006 inches. It can accommodate a flow of about 10.0 cc per minute with a small head loss (about 75 psi). This loss can be reduced markedly by increasing the diameter of the valve. In typical chromatographic applications (e.g. the illustrated valve), the diameter of the diaphragm within cavity 32 will be about 0.155 inches, and the diameter of the conduits 14 and 16 will be about 0.020 inches.

Figure 2:
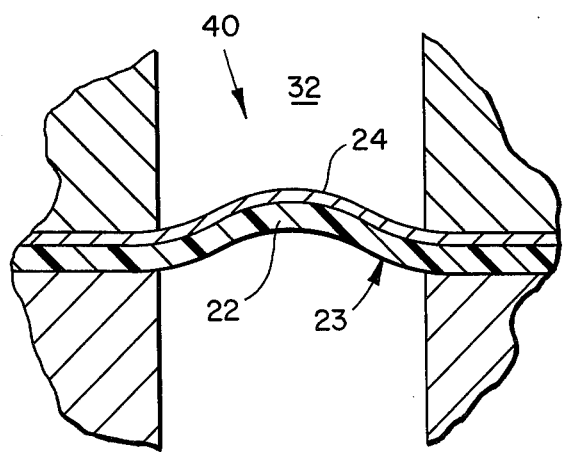
FIG. 2 shows the diaphragm of FIG. 1 in more detail.

In the more advantageous embodiments of the invention, the metal disc is initially formed and inserted as a conventional flat disc. Upon its first exposure to a high-pressure flow, say 5000 psig flow in the case of the illustrated valve, the disc will advantageously assume a modified bell-like profile 40, as is shown in FIG. 2, and thereafter will have somewhat the character of a disc-type spring snapping between open and shut positions as dictated by the position of the valve-actuating piston. The bell-shaped profile is particularly beneficial because while it adequately moderates the stress on the polymer diaphragm, i.e. it allows relatively quicker response and greater movement (typically about 0.015 inch in the center of the diaphragm, wherein the essential flow takes place, but still constrains movement of the diaphragm at the walls of cavity 32.

Despite this bell-shaped characteristic, it will be noted that there is no substantial deadspace: the diaphragm is, in the shut position, forced into a substantially flat position against the surface bearing the inlet and outlet ports. There are small projections in the diaphragm indicative of a small amount of "flow" into the outlet and inlet port. These projections are about 5 mils in thickness and remain static in size over the life of the valve.

It is to be understood that the following claims are intended to cover all of the generic and specific features of the invention herein described and all statements of the scope of the invention which might be said to fall therebetween.

What is claimed is:

1. In a diaphragm valve of the type wherein a diaphragm is adapted to be moved by an actuator means for an open position into a closed position, in which closed position said diaphragm has a sealing face forming means to interrupt flow between an inlet port and an outlet port, the improvement wherein A. said diaphragm is formed of a thin sheet of fluorocarbon polymer characterized by
      1. a compressive strength of about 5000 to 10,000 psi,
      2. a tensile elastic modulus of from about 100,000 to 400,000 psi;
   B. a metal support sheet forms means to moderate the rate at which said sheet of polymer moves away from said ports when said diaphragm is moved to a open position, said support sheet being positioned between said actuating means and said diaphragm, and C. wherein extended annular portions of said support sheet and said diaphragm are compressed together by the structure of said valve with said sealing face of the diaphragm mounted parallel to and, in its closed position, in sealing contact with said inlet and outlet ports.

2. A valve as defined in claim 1 wherein said ports and diaphragm are so sized that they accommodate a flow of about 10.0 cc per minute with a head loss of 75 psi or less.

3. A valve as defined in claim 3 wherein said diaphragm and support sheet are held in compression between a valve conduit-bearing block and an actuator housing block, said area of compression exceeding by at least 300% of the wetted area of said diaphragm 4. A valve as defined in claim 2 wherein said diaphragm and support sheet are held in compression between a valve conduit-bearing block and an actuator housing block, said area of compression exceeding by at least 300% of the wetted area of said diaphragm.

5. A valve as defined in claim 1 wherein said fluorocarbon polymer is a modified ETFE hydrocarbon.

6. A valve as defined in claim 2 wherein said fluorocarbon polymer is a modified ETFE hydrocarbon.

7. In a diaphragm valve of the type wherein a diaphragm is adapted to be moved by an actuator means from an open position into a closed position, in which closed position said diaphragm has a sealing face forming means to interrupt flow between an inlet port and an outlet port, the improvement wherein
  A. said diaphragm is formed of a thin sheet of fluorocarbon polymer characterized by
   1. a compressive strength of about 5,000 to 10,000 psi,
   2. a tensile elastic modulus of from about 100,000 to 400,000 psi;
  B. a support sheet forms means to moderate the rate at which said sheet of polymer moves away from said ports when said diaphragm is moved to an open position, said support sheet being positioned between said actuating means and said diaphragm;
  C. wherein extended annular portions of said support sheet and said diaphragm are compressed together by the structure of said valve with said sealing face of the diaphragm mounted parallel to and, in its closed position, in sealing contact with said inlet and outlet ports; and
  D. wherein said supporting sheet is of thin metal, is slightly bell shaped, and forms means to allow the fastest rate of movement of said diaphragm away from said inlet port to be at the center of said diaphragm.

8. A valve as defined in claim 7 wherein said diaphragm and support sheet are held in compression between a valve conduit-bearing block and an actuator housing block, said area of compression exceeding by at least 300% of the wetted area of said diaphragm.

9. A valve as defined in claim 7 wherein said fluorocarbon polymer is a modified ETFE hydrocarbon.

10. A valve as defined in claim 8 wherein fluorocarbon polymer is a modified ETFE hydrocarbon.

11. A valve as defined in claim 10 wherein said ports and diaphragm are so sized that they accommodate a flow of about 10.0cc per minute with a head loss of 75 psi or less.

12. A valve as defined in claim 11 wherein said diaphragm and support sheet are held in compression between a valve conduit-bearing block and an actuator housing block, said area of compression exceeding by at least 300% of the wetted area of said diaphragm.

13. A valve as defined in claim 12 wherein said fluorocarbon polymer is a modified PTFE polymer.

* * * * *